US010993120B1

(12) United States Patent
Lekutai

(10) Patent No.: US 10,993,120 B1
(45) Date of Patent: Apr. 27, 2021

(54) DRONE-ASSISTED DEPLOYMENT OF WIRELESS ACCESS INFRASTRUCTURE

(71) Applicant: T-Mobile USA, Inc., Bellevue, WA (US)

(72) Inventor: Gaviphat Lekutai, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/694,620

(22) Filed: Nov. 25, 2019

(51) Int. Cl.

| | |
|---|---|
| *H04W 16/18* | (2009.01) |
| *H04B 1/3822* | (2015.01) |
| *H04B 17/16* | (2015.01) |
| *H04B 17/29* | (2015.01) |
| *B64C 39/02* | (2006.01) |
| *B64D 47/08* | (2006.01) |
| *H04B 17/309* | (2015.01) |
| *H04B 7/26* | (2006.01) |
| *H04B 7/08* | (2006.01) |
| *H04B 7/17* | (2006.01) |
| *H04B 7/185* | (2006.01) |
| *H04B 17/14* | (2015.01) |
| *H04B 7/0456* | (2017.01) |
| *H04B 17/30* | (2015.01) |
| *H04B 7/06* | (2006.01) |

(Continued)

(52) U.S. Cl.
CPC .......... *H04W 16/18* (2013.01); *B64C 39/024* (2013.01); *B64D 47/08* (2013.01); *H04B 1/3822* (2013.01); *H04B 5/02* (2013.01); *H04B 7/024* (2013.01); *H04B 7/0486* (2013.01); *H04B 7/0615* (2013.01); *H04B 7/0671* (2013.01); *H04B 7/0673* (2013.01); *H04B 7/0691* (2013.01); *H04B 7/08* (2013.01); *H04B 7/0817* (2013.01); *H04B 7/17* (2013.01); *H04B 7/1856* (2013.01); *H04B 7/18543* (2013.01); *H04B 7/2606* (2013.01); *H04B 17/14* (2015.01); *H04B 17/16* (2015.01); *H04B 17/29* (2015.01); *H04B 17/30* (2015.01); *H04B 17/309* (2015.01); *B64C 2201/027* (2013.01); *B64C 2201/143* (2013.01)

(58) Field of Classification Search
CPC ............ B64C 39/024; B64C 2201/146; B64C 2201/027; B64C 2201/12; B64C 2201/141; B64C 2201/122; H04B 7/18504; H04B 17/318; H04B 17/309; H04B 7/01; H04B 7/0413; H04B 7/0617; H04B 17/12; H04B 17/27; H04B 17/345; H04B 1/1036
See application file for complete search history.

(56) References Cited

U.S. PATENT DOCUMENTS

| | | |
|---|---|---|
| 9,913,102 B2 | 3/2018 | Singh et al. |
| 9,942,721 B2 | 4/2018 | Zavesky et al. |

(Continued)

*Primary Examiner* — Fred A Casca
(74) *Attorney, Agent, or Firm* — Han Santos, PLLC

(57) ABSTRACT

A first unmanned aerial vehicle (UAV) test cell may be positioned at a first position and a second UAV test cell may be positioned at a second position. The first position and the second position may be designated as a pair of unbroken link positions in response to a line-of-sight (LOS) wireless communication link being unblocked between the first UAV test cell and the second UAV test cell. Otherwise, the first position and the second position may be designated as a pair of broken link positions in response to the LOS wireless communication link being blocked between the first UAV test cell and the second UAV test cell.

16 Claims, 5 Drawing Sheets

(51) Int. Cl.
  *H04B 5/02*    (2006.01)
  *H04B 7/024*   (2017.01)

(56) References Cited

U.S. PATENT DOCUMENTS

| | | |
|---|---|---|
| 2015/0204869 A1 | 7/2015 | Casals-Pascual et al. |
| 2015/0312774 A1* | 10/2015 | Lau ................ H04W 24/10 |
| | | 455/446 |
| 2016/0309337 A1 | 10/2016 | Priest et al. |
| 2017/0150373 A1* | 5/2017 | Brennan ............ H04W 16/28 |

* cited by examiner

DRONE-ASSISTED DEPLOYMENT OF WIRELESS ACCESS INFRASTRUCTURE

BACKGROUND

The implementation of a new network of a wireless carrier may necessitate that proposed locations for base station antennas be tested for a clear line-of-sight and interference from neighboring radio signal emitting devices and equipment. The process to test possible base antenna locations may be arduous and costly. Typically, base station antennas are installed at a higher elevation than the surrounding ground elevation, so these are generally installed on existing towers and poles, or on existing buildings. To test the line-of-sight and interference at a proposed base station antenna location and elevation, a test base station antenna is temporarily secured to an existing structure or the test base station antenna can be temporarily held in place at a specific location and elevation by a crane.

For a line-of-sight test or an interference test, a test user device or a second test base station antenna is needed, and these may be wirelessly linked to the proposed test base station antenna. The second base station antenna may also need to be installed on a neighboring structure or held in place by a second crane. Whether the test base station antennas are temporarily installed on structures or held in place with cranes, the process is time consuming and expensive. First, for mounting the test base station antenna to an existing structure, the wireless carrier wanting to conduct a line-of-sight and interference test may need to first secure the right, from the property owners, to temporarily install base station antennas on existing structures. This may lead to extensive negotiations that may delay the base station antenna line-of-sight and interference test and may delay the overall deployment of the new network. Second, after access to the existing structures is secured for the line-of-sight test or the interference test, the wireless carrier may still install specific antenna mounts and support to temporarily secure the test base station antennas on the existing structure. In addition to this, the wireless carrier may route electrical and telephone utility services and other ancillary equipment to the test base station antennas. This may lead to additional construction delays and expenses for the line-of-sight and interference test.

Similarly, mounting the test base station antenna to a crane may lead to significant challenges. Positioning and deploying a crane in a specific location may require permitting from the Federal Aviation Administration (FAA), permitting for street closures and the installation of temporary traffic control measures, all of which may significantly delay and increase the cost of the line-of-sight and interference test.

The challenges posed by the current line-of-sight and interference testing procedures may significantly delay the deployment of the new networks or may cause the proposed base station antennas to perform at a level that is lower than initially intended.

BRIEF DESCRIPTION OF THE DRAWINGS

The detailed description is depicted with reference to the accompanying figures, in which the left most digit(s) of a reference number identifies the figure in which the reference number first appears. The use of the same reference numbers in different figures indicates similar or identical items.

DETAILED DESCRIPTION

Figure 1:
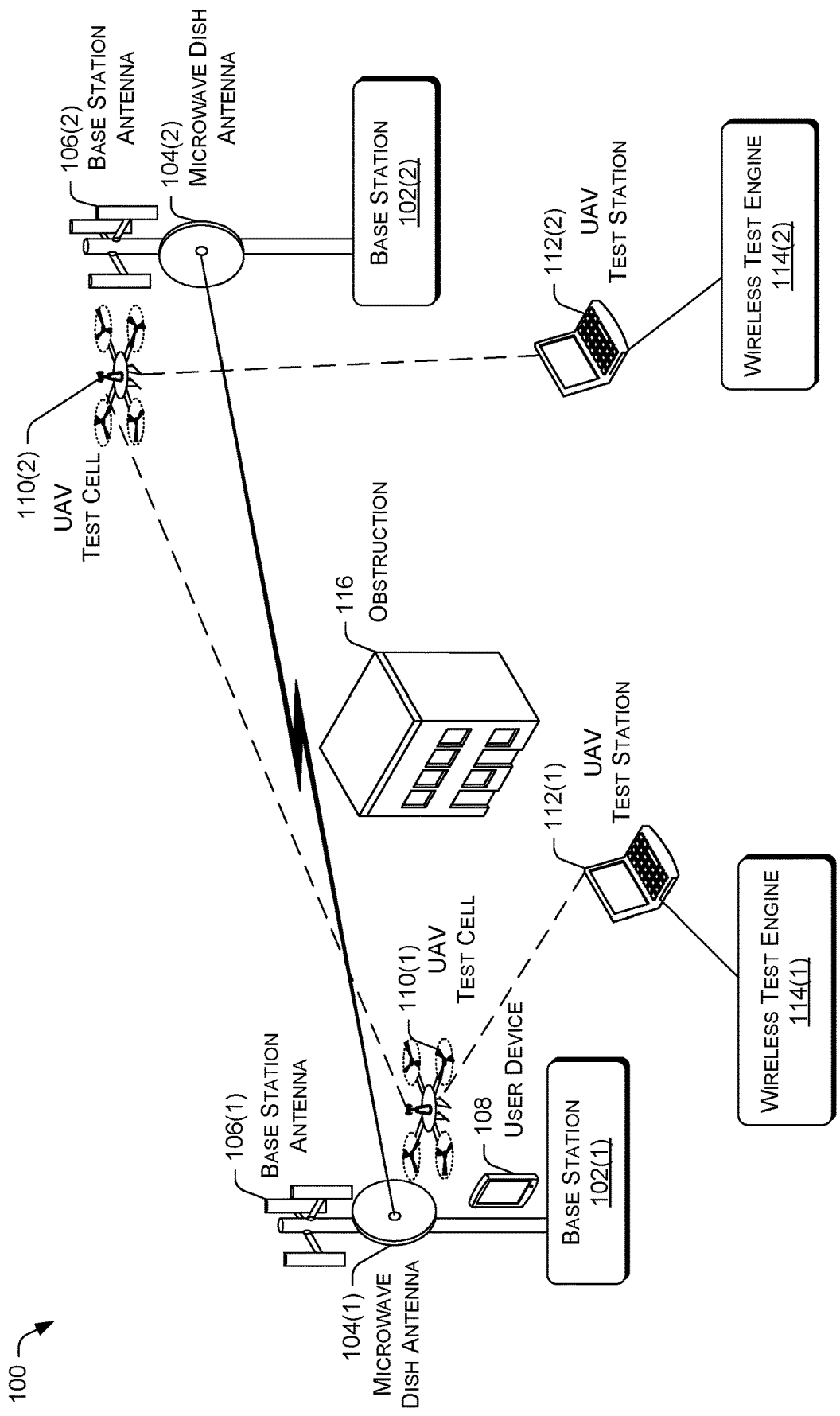
FIG. 1 illustrates an example architecture for implementing a drone-assisted deployment of wireless access infrastructure.

This disclosure is directed to the use of unmanned aerial vehicle (UAV) test cell equipped with wireless access infrastructure to test proposed locations for base station antennas. A drone-assisted line-of-sight test may be used to establish an unobstructed and unencumbered line-of-sight wireless communication link between a proposed UAV test cell and a user device. A drone-assisted interference test may be used to verify the absence of radio frequency interference between the proposed base station antenna and the antennas of other wireless signal emitting devices installed in its proximity. The drone-assisted deployment of line-of-sight and interference tests may include two UAV test cells paired to at least one UAV test station to test the wireless communication link between the UAV test cells.

For example, in the line-of-sight test, a first UAV test cell may take the place of the proposed wireless communication antenna and a second UAV test cell may take the place of a second wireless communication antenna, in which each of the first and second wireless communication antennas may be an air interface antenna of a base station, a backhaul relay (e.g., microwave) antenna, or a user device antenna In some instances, the first UAV test cell may be directed by its paired UAV test station to a position of a proposed wireless communication antenna and the second UAV test cell may be directed by its paired UAV test station to a position of another wireless communication antenna. The two UAV test cells may attempt to establish a wireless communication link via their onboard antennas to verify a line-of-sight between the first and second UAV test cells. A line-of-sight means that there is a lack of obstructions between the first and the second UAV test cell that may degrade the signal robustness of the established wireless link. Similarly, the first and second UAV test cells deployed to the corresponding positions may be used to test for the presence or absence of signal interference from other wireless signal emitting devices. A condition of no interference means that there is a lack of degradation of the wireless signal robustness between the first and second UAV test cells by the presence of other wireless signal emitting devices in the proximity of the two UAV test cells.

As a result of the line-of-sight and interference tests, the wireless carrier may determine the positions for the placement of proposed wireless communication antennas on existing structures within an environment of dense wireless signal exposure. In one scenario, a line-of-sight wireless communication link is typically used for an installation of a 5G base station antenna in a 5G millimeter wave deployment scenario, so that a clear line-of-sight between the base station antenna and customer premise equipment (CPE) may be ensured for deployment in the 24 Gigahertz (GHz) band, the 28 GHz band, the 39 GHz band, and/or so forth. For example, the CPE equipment may include user devices that are located in the homes of customers. The use of the line-of-sight test may enable the permanent deployment of the 5G millimeter wave base station antennas to fixed locations such that the antennas are not moved after installation. In the case of a high-rise building, the use of the line-of-sight test may result in the deployment of one or more antennas that service multiple floors of the high-rise building. In another scenario, the line-of-sight and interference tests may be used to simulate microwave backhaul relay links between microwave dish antennas in the 28 GHz band and/or other bands. In additional scenarios, the line-of-sight and interference tests may be used to simulate vehicle-to-infrastructure (V2I) wireless communication deployment, such as moving vehicles to static sensor and/or road side unit (RSU) wireless communication links on the 5.9 GHz band or another band. For example, in one of these scenarios, one UAV test cell may be used to represent an RSU or a static sensor on a side of a road, and another UAV test cell may be used to represent a moving vehicle on the road. The techniques described herein may be implemented in several ways. Example implementations are provided below with reference to the following FIGS. 1-5.

Example Environment Architecture

FIG. 1 illustrates an example environment 100 for implementing the drone-assisted deployment of wireless access infrastructure. The environment 100 may include at least one base station, such as the base station 102(1), that is operated by a wireless telecommunications carrier. For example, the base station 102(1) may be installed on an existing building, a water tank or any other structure that can support antennas and radio equipment. The base station 102(1) may support a directional communication microwave dish antenna 104(1) that may sustain the operation of existing communication equipment and at least one antenna 106(1). The microwave dish antenna 104(1) may be communicatively connected to a second microwave dish antenna 104(2) that is installed on a second base station 102(2). The second base station 102(2) may support at least one other antenna 106(2) that is operated by any wireless telecommunications carrier. The wireless telecommunications carrier may include multiple base stations, that are responsible for handling voice and data traffic for at least one user device 108.

The drone-assisted deployment of a wireless access test may include using a UAV test cell 110(1) to establish a wireless communication link with a UAV test cell 110(2) to conduct a line-of-sight test and/or an interference test. A line-of-sight test is a determination that a wireless communication link between two UAVs is not broken, while the interference test is a determination of the wireless signal robustness of the wireless communication link between the two UAVs. For example, the wireless signal robustness is a quality measurement of the wireless communication link, which can be determined based on a comparison of the signal robustness value of the wireless communication link to a predetermined wireless signal threshold value. In various instances, a wireless signal threshold value may have been previously determined as a minimum threshold of signal quality that is acceptable for sending and receiving communication over a wireless communication link. Accordingly, different types of wireless communication links, e.g., air interface, backhaul relay, etc. may have different wireless signal threshold values. The signal robustness of the wireless communication link may be expressed in a multitude of ways, such as via signal strength values or signal quality values. Signal strength may be measured via received signal strength indicator (RSSI), reference signal received power (RSRP), received channel power indicator (RCPI), or other signal strength measurements. Signal quality may be measured through energy to interface ratio (ECIO), reference signal received quality (RSRQ), signal to interference-plus-noise ratio (SINR), or other signal quality measurements. For example, the other signal quality measurements may include bit error rate (BER) for microwave communication links, low density parity check (LPDC) for microwave communication links, packet error rate (PER) for vehicle-to-everything (V2X) communication links, received signal code power (RSCP) for 3G communication links, and block error rate (BLER) for 5G communication links. The observed signal robustness value may be used to determine whether the wireless communication link of at least one antenna of a base station may be installed near other wireless signal emitting devices without interference to the wireless communication link. If the signal robustness value is deemed to at least meet the wireless signal threshold value, the wireless communication link may operate unimpeded from interference. In some embodiments, the wireless communication link may be an air interface link provided in accordance with one or more technical standards, such as Enhanced Data Rates for GSM Evolution (EDGE), Wideband Code Division Multiple Access (W-CDMA), High Speed Packet Access (HSPA), Long Term Evolution (LTE), CDMA-2000 (Code Division Multiple Access 2000), 5th Generation (5G), and/or so forth, such as an air interface link that uses millimeter radio waves. In other embodiments, the wireless communication link may be a wireless backhaul relay link, such as a microwave link or a link that uses some other radio or light spectrum (e.g., infrared).

For performing the line-of-sight test and/or the interference test, the UAV test cell 110(1) is communicatively paired to UAV test station 112(1), and the UAV test cell 110(1) may receive commands from the UAV test station 112(1) via a physical wired connection. In other embodiments, rather than being physically connected, the UAV test cell 110(1) may be wirelessly linked to UAV test station 112(1) and the wired cable may be replaced with a wireless signal, such as wireless signals of Wi-Fi frequencies, frequencies in the infrared spectrum, and/or any other frequency used to control the UAV test cells. Likewise, the UAV test cell 110(2) is communicatively paired to the UAV test station 112(2). The UAV test station 112(2) may communicate with and control the UAV test station 112(2) via a physical wired connection or wireless signals of Wi-Fi frequencies, frequencies in the infrared spectrum, and/or any other frequency used for controlling devices. In other embodiments, the UAV test station 112(2) may communicate with and control the UAV test station 112(1) via a physical wired connection or wireless signals of Wi-Fi frequencies, frequencies in the infrared spectrum or any other frequency used for controlling devices, or vice versa. In additional embodiments, one UAV test station (e.g., the UAV test station 112(1)) may be communicatively paired to two UAV test cells, such as the UAV test cell 110(1) and the UAV test cell 110(2). For example, in such embodiments, to provide control to two separate UAV test cells, the single UAV test station may be equipped with two physical control wires or two separate wireless links, connecting the UAV test station to two UAV test cells.

For the line-of-sight test, the UAV test station 112(1) may use a wireless test engine 114(1) to deploy the UAV test cell 110(1) in conjunction with the deployment of the UAV test cell 110(2). For example, the UAV test station 112(1) may directly deploy the UAV test cell 110(2) or command the UAV test station 112(2) to deploy the UAV test cell 110(2). During the test, the wireless test engine 114(1) may record a first position of the first UAV test cell 110(1) and a second position of the second UAV test cell 110(2). Each position of a UAV test cell includes geolocation coordinates (e.g., a longitudinal coordinate and a latitude coordinate) and an elevation of the UAV test cell. In some embodiments, each position may further include a vertical angular orientation for an antenna of the UAV test cell, and a horizontal angular orientation for the antenna of the UAV test cell. The elevation is an altitude of the UAV test cell 110(1) with respect to a base point, such as the ground elevation or the average mean sea level. For example, the vertical angular orientation may be a positive or negative angle of an antenna onboard a UAV test cell in the vertical plane from a horizontal position, in which the antenna is used in the corresponding test. The horizontal angular orientation may be the angle of the antenna onboard the UAV test cell in the horizontal plane from a true north orientation.

The wireless test engine 114(1) may further record whether a wireless communication link between the UAV test cell 110(1) and the UAV test cell 110(2), as implemented via their corresponding antennas, is blocked or not blocked. The line-of-sight test may be repeated multiple times, with UAV test cell 110(1) and UAV test cell 110(2) deployed to alternate locations. For example, the wireless test engine 114(1) may direct UAV test cell 110(1) in conjunction with UAV test cell 110(2) to a third and fourth position, respectively. The wireless test engine 114(1) may record the third position for UAV test cell 110(1) and the fourth position for UAV test cell 110(2). The wireless test engine 114(1) may further record whether the wireless communication link between UAV test cell 110(1), in the third position, and the UAV test cell 110(2), in the fourth position, is blocked or not blocked, and so on and so forth. In this way, the wireless test engine 114(1) may place the UAV test cell 110(1) and/or the UAV test cell 110(2) in multiple pairs of positions and determine for each pair of positions whether the wireless communication link is blocked or not blocked. Some of the positions in the pairs of positions for which the wireless communication link is not blocked can then be used for potential positions for the placement of the base station antennas.

Alternatively, the UAV test station 112(2) may use a wireless test engine 114(2) to deploy the UAV test cell 110(2) in conjunction with the deployment of the UAV test cell 110(1). For example, the UAV test station 112(2) may directly deploy the UAV test cell 110(2) or direct the UAV test station 112(1) to deploy the UAV test cell 110(2). The wireless test engine 114(2) may record a first position of the second UAV test cell 110(2) and a second position of the first UAV test cell 110(1). The wireless test engine 114(1) may further record whether a wireless communication link between the UAV test cell 110(2) and the UAV test cell 110(1) is blocked or not blocked. The line-of-sight test may be repeated multiple times, with UAV test cell 110(2) and UAV test cell 110(1) deployed to alternate locations. For example, the wireless test engine 114(2) may direct UAV test cell 110(2) in conjunction with the UAV test cell 110(1) to a third and fourth position, respectively. The wireless test engine 114(2) may record the third position for UAV test cell 110(2) and the fourth position for UAV test cell 110(1). The wireless test engine 114(2) may further record whether the wireless communication link between UAV test cell 110(2), in the third position, and the UAV test cell 110(1), in the fourth position, is blocked or not blocked. In this way, the wireless test engine 114(2) may place the UAV test cell 110(2) and/or the UAV test cell 110(1) in multiple pairs of positions and determine for each pair of positions whether the wireless communication link is blocked or not blocked. Some of the positions in the pairs of positions for which the wireless communication link is not blocked can then be used for potential positions for the placement of the base station antennas.

The line-of-sight test may be used to test the wireless communication link in several embodiments. In at least one embodiment, the first UAV test cell 110(1) may be placed at the position of the proposed base station antenna, while the second UAV test cell 110(2) may be placed at the position of a user device. In an additional embodiment, the UAV test cell 110(1) may be placed at the position of an existing or proposed microwave dish antenna, and the UAV test cell 110(2) may be placed at the position of an additional existing or proposed microwave dish antenna. In both scenarios, the line-of-sight test is the confirmation of the presence or absence of obstructions, such as manmade structures (e.g., building 116), vegetation, terrain contours, and/or other factors that block radio signals. The line-of-sight test is a verification that the wireless communications link between the proposed base station antenna and the user device, or the wireless communication link between two proposed microwave dish antennas, is not blocked.

For the interference test, the UAV test station 112(1) may use the wireless test engine 114(1) to deploy the UAV test cell 110(1) in conjunction with the deployment of the UAV test cell 110(2). For example, the UAV test station 112(1) may directly deploy the UAV test cell 110(2) or direct the UAV test station 112(2) to deploy the UAV test cell 110(2). The wireless test engine 114(1) may record a first position of the first UAV test cell 110(1) and a second position of the second UAV test cell 110(2). Each position of a UAV test cell includes geolocation coordinates (e.g., a longitudinal coordinate and a latitudinal coordinate) and an elevation of the UAV test cell. In some embodiments, each position may further include a vertical angular orientation for an antenna of the UAV test cell, and a horizontal angular orientation for the antenna of the UAV test cell, in which the antenna is used in the corresponding test. The wireless test engine 114 may further record whether a signal robustness value of the wireless communication link between the UAV test cells 110(1) and 110(2) meets a wireless signal threshold value. For example, the wireless test engine 114 may record whether a wireless communication signal emitted from the UAV test cell 110(1) and received at the UAV test cell 110(2) meets the wireless signal threshold value.

Thus, if the signal robustness value of the wireless communication link at least meets the wireless signal threshold value, the wireless test engine 114 may determine that there is lack of problematic interference between the first position and the second position, such that at least one of these positions is suitable for the deployment of a base station antenna. Nevertheless, the wireless test engine 114 may move the UAV test cell 110(1) and/or the UAV test cell 110(2) to other positions to find additional pairs of positions for which there is no problematic interference, so that additional positions for the deployment of at least one base station antenna can be ascertained. However, if the signal robustness value of the wireless communication link fails to meet the wireless signal threshold value, the wireless test engine 114 may move the UAV test cell 110(1) and/or the UAV test cell 110(2) to other positions so that a pair of positions for which no problematic interference may be found.

Alternatively, the UAV test station 112(2) may use wireless test engine 114(2) to deploy the UAV test cell 110(2) in conjunction with the deployment of the UAV test cell 110(1). The wireless test engine 114(2) may record a first position of the second UAV test cell 110(2) and a second position of the first UAV test cell 110(1). The wireless test engine 114(2) may further record whether a signal robustness value of the wireless communication link between the UAV test cells 110(2) and 110(1) meets the wireless signal threshold value. For example, the wireless test engine 114(2) may record whether a wireless communication signal emitted from the UAV test cell 110(2) and received at the UAV test cell 110(1) meets the wireless signal threshold value.

The interference test may be used to test the wireless communication link in several embodiments. In at least one embodiment, the UAV test cell 110(1) may be placed in the position of a proposed base station antenna near an existing microwave dish antenna, while the UAV test cell 110(2) may be placed in the position of a user device. The wireless signal robustness of the wireless communication link may be affected by the interference between the proposed base station antenna and/or the user device and the neighboring microwave dish antenna, such as microwave dish 104(1). The signal propagated by the microwave dish antenna 104(1) may interfere with the wireless communications link established between the UAV test cell 110(1) and the UAV test cell 110(2). In this analysis, the signal robustness value may attenuate as a result of a radio frequency used by the microwave dish antenna 104(1) creating interference with the radio frequency used by the UAVs in the wireless communication link. The interference may develop as a result of a UAV being too close in proximity to the microwave dish antenna, a UAV being too close in proximity to a microwave dish antenna Fresnel zone, the wireless communication link being too close in proximity to a microwave dish antenna Fresnel zone, and/or any other factors that cause path attenuation due to the operation of microwave dish antennas.

In another embodiment, the UAV test cell 110(1) may be placed in the position of the proposed base station antenna near at least one existing base station antenna, while the UAV test cell 110(2) may be placed in the position of a user device. The signal robustness value of the wireless communication link may be affected by the interference between the proposed base station antenna and/or the user device and the neighboring base station antenna, such as base station antenna 106(1). The signal propagated by the existing base station antenna 106(1) may interfere with the wireless communication link established between the UAV test cell 110(1) and UAV test cell 110(2). In this analysis, the signal robustness value may attenuate as a result of the radio frequency used by the existing base station creating interference with radio frequency used by the UAVs in the wireless communication link. The interference may develop as a result of a UAV being too close in proximity to the existing base station antenna, a UAV being too close in proximity to the existing base station antenna wireless signal path, and/or any other factors that cause path attenuation due to the operation of existing base station antennas.

In a further embodiment, the UAV test cell 110(1) may represent an RSU or a static sensor on a side of a road and the UAV test cell 110(2) may represent a moving vehicle on the road. In this analysis, the signal robustness value may attenuate as a result of the radio frequency used by antennas of existing base stations, RSUs, or static sensors creating interference with radio frequency used by the UAVs in the wireless communication link.

Example UAV Test Cell Components

Figure 2:
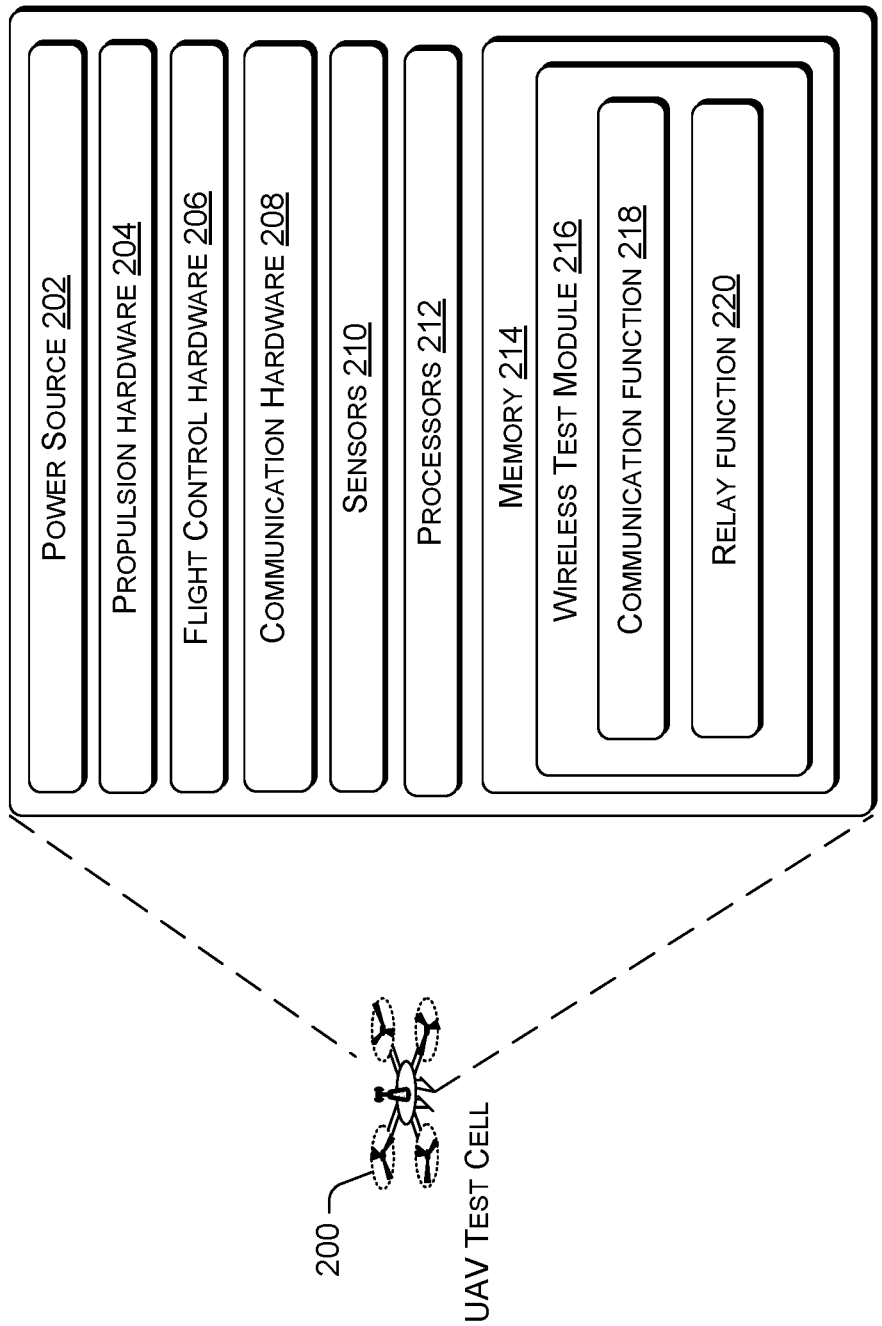
FIG. 2 is a block diagram showing various components of a UAV test cell that implements the drone-assisted deployment of wireless access infrastructure.

FIG. 2 is a block diagram showing various components of a UAV test cell that supports drone-assisted deployment of wireless access infrastructure. The UAV test cell 200 may include a power source 202, propulsion hardware 204, flight control hardware 206, communication hardware 208, sensors 210, one or more processors 212, and memory 214. The power source 202 may include electrical cells, combustible liquid fuel, combustible gas fuel, compressed gas, and/or other energy sources. In some embodiments, the power source 202 may be a ground-based energy source, rather than an energy source that is carried onboard the UAV test cell 200. In such embodiments, a power line or fuel line may convey the energy from the ground-based energy source to the UAV test cell 200. The propulsion hardware 204 may include mechanical devices that can convert the energy provided by the power source 202 into movements of the UAV test cell 200. For example, the propulsion hardware may include an internal combustion engine, an electrical motor, a jet engine, a turboprop engine, propellers, rotors, and/or so forth that are mounted on the wings and/or the body of the UAV test cell 200.

The flight control hardware 206 may include actuators and control surfaces that can steer the UAV test cell 200. For example, the actuators may include hydraulic actuators, gas-powered actuators, electrical actuators, and/or so forth. The actuators may move or deflect control surfaces to control the movement of the UAV test cell 200. The control surfaces may include tilt wings, rudders, slats, ailerons, elevators, trim tabs, fins, canards, and/or so forth. In some embodiments, the flight control hardware 206 may be integrated with the propulsion hardware 204. For example, such integrated hardware may include tilt rotors, variable pitch rotors, jet engines with movable thrust nozzles, and/or so forth.

The communication hardware 208 may include hardware components that enable the UAV test cell 200 to communicate with other UAV test cells. In various embodiments, the communication hardware 208 further includes cellular transceivers, hardware decoders and encoders, an antenna controller, a memory buffer, a network interface controller, a universal serial bus (USB) controller, and/or other signal processing and communication components. Accordingly, the communication hardware 208 may support the transmission and reception data for wireless communication. The communication hardware 208 may further include one or more antennas that support the transmission and reception of data signals. The antennas may include a Yagi antenna, a horn antenna, a dish reflector antenna, a slot antenna, a waveguide antenna, a Vivaldi antenna, a helix antenna, a planar antenna, a dipole array antenna, an origami antenna, and/or other types of antennas. In some instances, an antenna may be oriented to point to a direction via electrical beamforming and/or via mechanical movement of one or more elements of the antenna by an antenna controller.

The sensors 210 may include a camera, a radar, a compass, an airspeed sensor, an altitude sensor, a global positioning system (GPS) sensor, control setting sensors, propulsion setting sensors, and/or other sensors. The various sensors may provide operational information regarding the UAV test cell 200 that is transmitted by the communication hardware 208 to the UAV test station.

Each of the processors 212 may be a single-core processor, a multi-core processor, a complex instruction set computing (CISC) processor, or another type of processor. The memory 214 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital storage disks or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The one or more processors 212 and the memory 214 may implement a wireless test engine 216, a communication function 218, and a relay function 220. These modules may include routines, program instructions, objects, and/or data structures that perform tasks or implement abstract data types. The wireless test engine 216 may receive deployment or deactivation commands from an attached or paired UAV test station. In response to a deployment command, the wireless test engine 216 may manipulate the propulsion hardware 204 and the flight control hardware 206 to fly the UAV test cell 200 to a predetermined altitude and hover the UAV test cell 200 within a predetermined distance from the UAV test station. In response to a deactivation command, the wireless test engine 216 may use the propulsion hardware 204 and the flight control hardware 206 to land the UAV test cell 200 at a dock or an enclosure of the UAV test station.

For example, the wireless test engine 216 may receive various commands from a paired UAV test station, such as to fly, hold a position, initiate a test, take a test measurement, and deactivate. In at least one embodiment, the wireless test engine 216 may receive the commands via the communication hardware 208. On a command to fly to a specified position, the wireless test engine 216 in conjunction with the sensors 210 may manipulate the flight control hardware 206 and the propulsion hardware 204 to fly the UAV test cell 200 and/or move the antenna of the UAV test cell 200 to a position where the geolocation, elevation, vertical angular orientation, and horizontal angular orientation detected by the sensors 210, matches a UAV test station specified geolocation, elevation, vertical angular orientation, and horizontal angular orientation. On a command to hold a position, the wireless test engine 216 in conjunction with the sensors 210 may manipulate the flight control hardware 206 and propulsion hardware 204 to maintain the UAV test cell 200 at a specified position for the duration of a line-of-sight test, an interference test, or any other time period as specified by the UAV test station. In at least one embodiment, the maintenance of the UAV test cell 200 at the specific position may further include orienting the communication hardware 208 of the UAV test cell 200 in a particular direction that includes a particular vertical angular orientation and/or a particular horizontal angular orientation. On a command to deactivate, the wireless test engine 216 in conjunction with the sensors 210 may manipulate the flight control hardware 206 and propulsion hardware 204 to fly the UAV test cell 200 to a position that is specified by the UAV test station as a position of rest.

The communication function 218 of the wireless test engine 216 may coordinate the communications of the UAV test cell 200 with the paired UAV test station and other UAV test cells. The communication function 218 may use the communication hardware 208 to establish wireless communication links with the UAV test station and other UAV test cells that are within range of the UAV test cell 200, as well as send and receive test wireless communication. The UAV test cell 200 may receive a command to fly, hold a position, initiate a test, take a test measurement, and deactivate. Additionally, the communication hardware 208 in conjunction with the communication function 218 may receive line-of-sight and/or interference test position information, which may include geolocation, elevation, vertical angular orientation, and horizontal angular orientation information. For example, on a command to initiate a line-of-sight test or an interference test, the wireless test engine 216 may direct the communication function 218 to emit a wireless communication signal of a predetermined signal strength for a predetermined time duration. On a command to take a test measurement for an interference test, the wireless test engine 216 may direct the communication function 218 to use the communication hardware 208 to measure one or more signal robustness values of a received wireless communication signal during the predetermined time duration. On a command to take a test measurement for a line-of-sight test, the wireless test engine 216 may direct the communication function 218 to use the communication hardware 208 to determine whether a wireless communication signal is received by the communication hardware 208 during the predetermined time duration and a signal robustness value of the received wireless communication signal, if any.

The relay function 220 of the wireless test engine 216 may use the communication hardware 208 to route data to its paired UAV test station and additional UAV test cells. The data may include geolocation coordinates, elevation, vertical angular orientation, horizontal angular orientation, and test duration data that are measured or generated by the UAV test cell 200. For example, such data may include data for each test measurement of a completed test, in which the data may include a UAV identifier of the UAV test cell 200, a test identifier, a type of test (e.g., a line-of-sight test or an interference test), a time and date of the test measurement, a frequency of the wireless communication signal emitted for the test measurement, a signal strength of the wireless communication signal emitted for the test measurement, a wireless communication signal robustness value measured for the test measurement, a duration of the test measurement, a position of the UAV test cell 200 for the test measurement, and/or other test information. For example, the other information may include command execution success or failure logs, UAV status information, UAV diagnostic information, and/or so forth. In. Accordingly, the relay function 220 may send such data to the UAV test station for processing.

Example UAV Test Station Components

Figure 3:
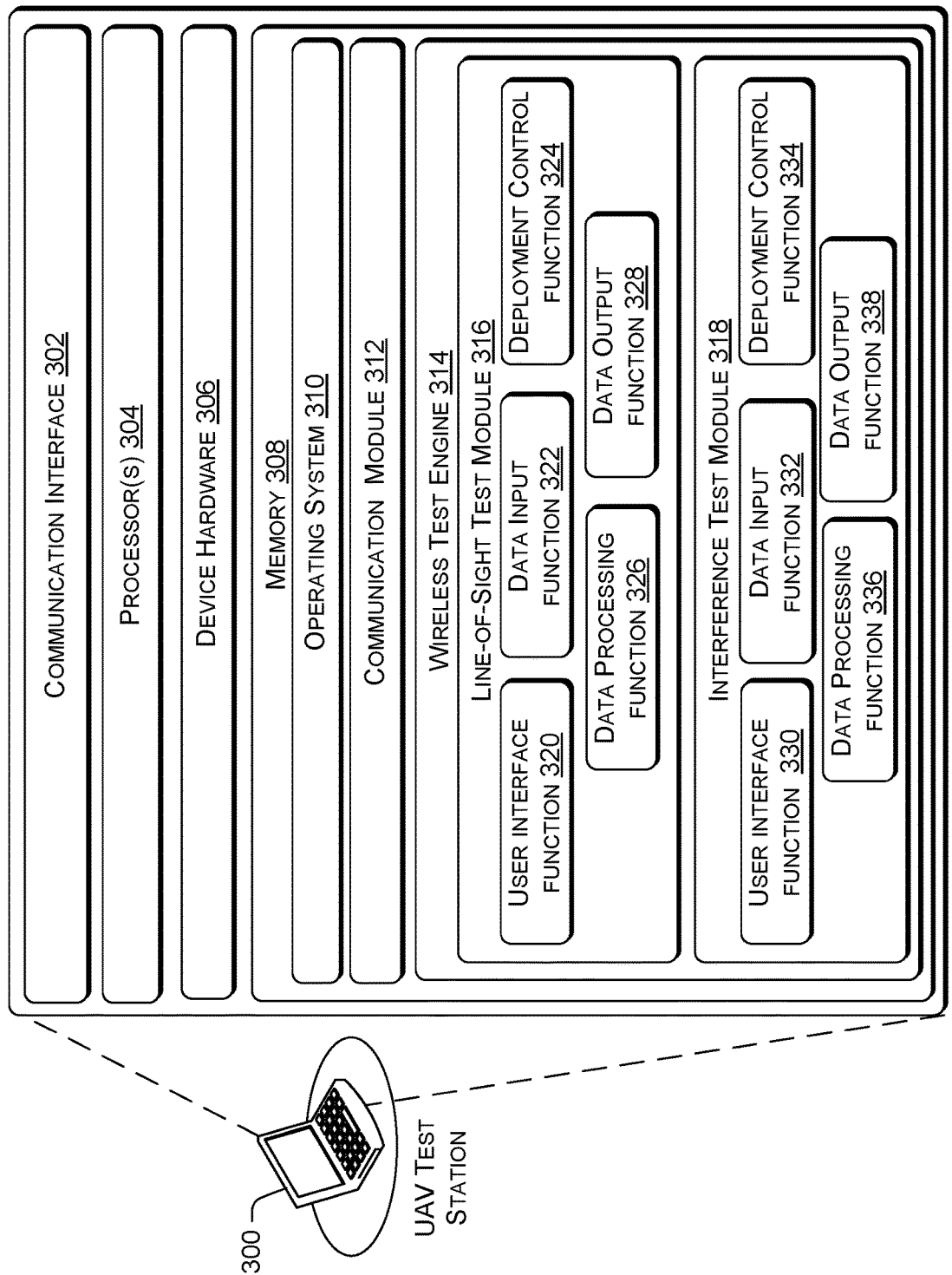
FIG. 3 is a block diagram showing various components of a UAV test station that implements the drone-assisted deployment of wireless access infrastructure.

FIG. 3 is a block diagram showing various components of a UAV test station that interacts with a UAV test cell to support the drone-assisted deployment of wireless access infrastructure. The UAV test station 300 may be implemented on one or more computing devices. The computing devices may include general purpose computers, servers, or other electronic devices that can receive input, processing the input, and generating output data. In other embodiments, the computing devices may be virtual computing devices in the form of virtual machines or software containers that are hosted in a cloud.

The UAV test station may include a communication interface 302, one or more processors 304, device hardware 306, and memory 308. The communication interface 302 may include wireless and/or wired communication components that enable the computing devices to transmit data to and receive data from UAV test cells or other networked devices via the wireless carrier network and/or an additional network. For example, the additional network may be a local area network (LAN), a larger network such as a wide area network (WAN), or a collection of networks, such as the Internet. The device hardware 306 may include additional hardware that performs user interface, data display, data communication, data storage, and/or other server functions.

The memory 308 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital storage disks or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The processors 304 and the memory 308 of the computing devices may implement an operating system 310, a communication module 312, and a wireless test engine 314. The modules may include routines, program instructions, objects, and/or data structures that perform tasks or implement abstract data types. The operating system 310 may include components that enable the computing devices to receive and transmit data via various interfaces (e.g., user controls, communication interface, and/or memory input/output devices), as well as process data using the processors 304 to generate output. The operating system 310 may include a presentation component that presents the output (e.g., display the data on an electronic display, store the data in memory, transmit the data to another electronic device, etc.). Additionally, the operating system 310 may include other components that perform various additional functions generally associated with an operating system.

The communication module 312 coordinates the communication between the UAV test station and a paired UAV test cell. The UAV test cell may communicate with the UAV test station 300 via a physical communication link. The physical communication may be a direct wired link between the UAV test cell and the UAV test station 300. In such instances, the communication module 312 may establish a communication link with the UAV network cell that enables the exchange of data via a communication protocol, such as the transmission control protocol (TCP), the user datagram protocol (UDP), or another protocol. Alternatively, the UAV test station 300 may communicate wirelessly with the paired UAV test cell. As such, the communication module 312 may use a licensed band or an unlicensed band to establish a communication link with the paired UAV test cell.

The wireless test engine 314 may include a line-of-sight test module 316 and an interference test module 318. The line-of-sight test module 316 may include a user interface function 320, a data input function 322, a deployment control function 324, a data processing function 326, and a data output function 328. The user interface function 320 may send output to one or more data output devices (e.g., visual display, audio speakers), and receive input from one or more data input devices. The data input devices may include, but are not limited to, combinations of one or more of keypads, keyboards, mouse devices, touch screens that accept gestures, microphones, voice or speech recognition devices, and any other suitable devices. The data input devices may permit the user to input line-of-sight test parameters, which may include a UAV identifier, a set of UAV test cell geolocation coordinates, an elevation, a vertical angular orientation, a horizontal angular orientation, a frequency of the wireless communication signal, a strength of the wireless communication signal, a configuration of a UAV test cell as an initiator of the wireless communication signal or a recipient measurer of the wireless communication signal, and a test duration for each UAV test cell that is participating in the test measurement. Alternatively, the data input devices may permit the user to manually control the UAV test cell or amend ongoing line-of-sight test procedures. Alternatively, the output user devices may permit the user extract and/or manipulate the line-of-sight test results, which may include a UAV identifier, the corresponding UAV test cell position, the elevation, the vertical angular orientation, the horizontal angular orientation, the frequency of the wireless communication link, the signal strength of the wireless communication link, a designation of the test measurement for the line-of-sight test as being blocked or unblocked, and the corresponding pair of unbroken or broken link positions.

The data input function 322 may receive a test configuration file for conducting a line-of-sight test that is uploaded or inputted by a user. The test configuration file for a line-of-sight test may include test parameters for conducting one or more test measurements. The test parameters for each test measurement may include a UAV identifier, a set of UAV test cell geolocation coordinates, an elevation, a vertical angular orientation for the antenna of the UAV test cell, a horizontal angular orientation for the antenna of the UAV test cell, a frequency of the wireless communication signal, a strength of the wireless communication signal, a configuration of a UAV test cell as an initiator of the wireless communication signal or a recipient measurer of the wireless communication signal, and a test duration for each UAV test cell that is participating in the test measurement. In some instances, the test parameters for a plurality of test measurements may specify positions that are a predetermined distance from each other. Accordingly, the deployment control function 324 may use a deployment algorithm to translate the test parameters for each test measurement of the line-of-sight test into commands for each participating UAV test cell. For example, the deployment algorithm may take into account a current location and operational status (e.g., in-flight, ready for takeoff, etc.) of a UAV test cell to generate commands that direct the UAV test cell to conduct each test measurement of the line-of-sight test. For example, the commands may include commands to take off, fly, hold a position, initiate a test, take a test measurement, and deactivate.

To deploy at least one UAV test cell, the deployment control function 324 may command a UAV test cell to fly, hold a position, initiate a test, take a measurement, or deactivate. On a command to fly, the deployment control function 324 may transmit at least one corresponding line-of-sight test position to the UAV test cell and direct it to travel to the line-of-sight test position. On a command to hold a position, the deployment control function 324 may direct the UAV test cell to maintain the line-of-sight test position. On a command to initiate a test, the deployment control function 324 may direct the UAV test cell to emit a wireless communication signal of a predetermined signal strength for a predetermined time duration. On a command to take a measurement, the deployment control function 324 may direct the UAV test cell to determine whether an emitted wireless communication signal is received during the predetermined time duration and a signal robustness value of the received wireless communication signal, if any. On a command to deactivate, the deployment control function 324, may direct the UAV test cell to travel to its initial starting position or any other position considered to be a position at rest.

In at least one embodiment, once a UAV test cell is in the line-of-sight test position, the deployment control function 324 may receive confirmation from the UAV test cell that the UAV test cell is in position. Alternatively, upon a failure to receive confirmation that the UAV test cell is in the line-of-sight position, the deployment control function 324 may direct the UAV test cell to relocate to an alternate line-of-sight test position, as provided by the test configuration file. Otherwise, the deployment control function 324 may direct the UAV test cell to return to its initial position and may deploy another UAV test cell to the line-of-sight test position.

Upon receipt of confirmation that a pair of UAV test cells participating in taking a test measurement for the line-of-sight test are in their respective positions, the deployment control function 324 may command a first UAV test cell of the pair to transmit a wireless communication signal and a second UAV test cell of the pair to take one or more measurements of the signal robustness value of a corresponding wireless communication link as received by the second UAV test cell.

The data processing function 326 may process a test measurement result of a line-of-sight test to determine whether a corresponding wireless communication link between a pair of UAV test cells is blocked or not blocked. The data processing function 326 in conjunction with the memory 308 may record data from multiple test measurements for a line-of-sight test. In some embodiments, the one or more test measurements for a line-of-sight test may be generated by placing the first and second UAV test cells in multiple locations, or by the first UAV test cell being communicatively linked to multiple UAV test cells, or any combination thereof. Following the analysis of at least one test measurement of the line-of-sight test, the data processing function 326 may provide one or more unblocked position pairs for the installation of the proposed base station antennas.

In various embodiments, the data processing function 326 may classify a position pair of UAV test cells as a pair of unbroken link positions if the wireless communication signal as transmitted by a first UAV test cell of the corresponding pair is received by a second UAV test cell of the corresponding pair during the duration of a test measurement included in a line-of-sight test. This is because the received signal indicates that the wireless communication link between the first UAV test cell and the second UAV test cell is unblocked. On the other hand, the data processing function 326 may classify the position pairs of UAV test cells as a pair of broken link positions when the second UAV test cell does not receive the wireless communication signal.

In alternative embodiments, the signal robustness value of the received signal must also at least meet the wireless signal threshold value for the link to be considered unblocked and the position pair of UAV test cells to be classified as a pair of unbroken link positions. In such embodiments, if the wireless communication signal is not received or if the signal robustness value of the received wireless communication signal does not meet the wireless signal threshold value, the data processing function 326 may deem the link to be blocked and classify the position pairs of the UAV test cells as a pair of broken link positions. For example, a received wireless communication signal that does not meet the signal robustness value may be caused by a partial obstruction of the signal, a reflection of the signal off of an obstruction, a refraction of the signal off of an obstruction, and/or so forth.

The data processing function 326, in conjunction with the data output function 328, may log and store the line-of-sight test results, which may include a UAV identifier, the corresponding UAV test cell position, the elevation, a vertical angular orientation for the antenna of the UAV test cell, a horizontal angular orientation for the antenna of the UAV test cell, the frequency of the wireless communication link, the signal strength of the wireless communication link, a designation of the test measurement for the line-of-sight test as being blocked or unblocked, and the corresponding pair of unbroken or broken link positions. Such data may be stored by the data output function 328 in an array format or any other format from which the user may readily correlate the line-of-sight test results to the pairs of unbroken and/or broken link positions. Subsequently, the data processing function 326 may designate at least one unbroken link position of a particular pair of unbroken link positions as a placement position for a corresponding antenna. For example, the data processing function 326 may designate a first position of a pair of unbroken line-of-sight wireless communication link positions as a position for mounting a first antenna, and a second position of the pair as a position for mounting a second antenna such that the first antenna and the second antenna may be used to establish a wireless communication link.

The interference test module 318 may include a user interface function 330, a data input function 332, a deployment control function 334 and a data processing function 336, and a data output function 338. The user interface function 330 may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices. The data input devices may permit the user to input interference test parameters, which may include a UAV identifier, a set of UAV test cell geolocation coordinates, an elevation, a vertical angular orientation for the antenna of the UAV test cell, a horizontal angular orientation for the antenna of the UAV test cell, a frequency of the wireless communication signal, a strength of the wireless communication signal, a configuration of a UAV test cell as an initiator of the wireless communication signal or a recipient measurer of the wireless communication signal, and a test duration for each UAV test cell that is participating in the test measurement. Alternatively, the data input devices may permit the user to manually control the UAV test cell or amend ongoing interference test procedures. Alternatively, the output user devices may permit the user to extract and/or manipulate the interference test results, which may include a UAV identifier, the corresponding UAV test cell position, the elevation, the vertical angular orientation, the horizontal angular orientation, the frequency of the wireless communication link, the signal strength of the wireless communication link, the signal robustness value, and a designation of the test measurement for the interference test as meeting a wireless signal threshold value.

The data input function 332 may receive a test configuration file for conducting an interference test that is uploaded or inputted by a user. The test configuration file for an interference test may include test parameters for conducting one or more test measurements. The test parameters for each test measurement may include a UAV identifier, a set of UAV test cell geolocation coordinates, an elevation, a vertical angular orientation for the antenna of the UAV test cell, a horizontal angular orientation for the antenna of the UAV test cell, a frequency of the wireless communication signal, a strength of the wireless communication signal, a configuration of a UAV test cell as an initiator of the wireless communication signal or a recipient measurer of the wireless communication signal, and a test duration for each UAV test cell that is participating in the test measurement. In some instances, the test parameters for a plurality of test measurements may specify positions that a predetermined distance from each other. Accordingly, the deployment control function 334 may use a deployment algorithm to translate the test parameters for each test measurement of the interference test into commands for each participating UAV test cell. For example, the deployment algorithm may take into account a current location and operational status (e.g., in-flight, ready for takeoff, etc.) of a UAV test cell to generate commands that direct the UAV test cell to conduct each test measurement of the interference test. For example, the commands may include commands to take off, fly, hold a position, initiate a test, take a test measurement, and deactivate.

To deploy at least one UAV test cell, the deployment control function 334 may command a UAV test cell to fly, hold a position, initiate a test, take a measurement, or deactivate. On a command to fly, the deployment control function 334 may transmit at least one corresponding interference test position to the UAV test cell and direct it to travel to the interference test position. On a command to hold a position, the deployment control function 334 may direct the UAV test cell to maintain the interference test position. On a command to initiate a test, the deployment control function 334 may direct the UAV test cell to emit a wireless communication signal of a predetermined signal strength for a predetermined duration. On a command to take a measurement, the deployment control function 334 may direct the UAV test cell to measure one or more signal robustness values of a received wireless communication signal during the predetermined time duration. On a command to deactivate, the deployment control function 334, may direct the UAV test cell to travel to its initial starting position or any other position considered to be a position at rest.

In at least one embodiment, once a UAV test cell is in the interference test position, the deployment control function 334 may receive confirmation from the UAV test cell that the UAV test cell is in position. Alternatively, upon a failure to receive confirmation that the UAV test cell is in the interference test position, the deployment control function 334 may direct the UAV test cell to relocate to an alternate interference test position, as provided by the test configuration file. Otherwise, the deployment control function 334 may direct the UAV test cell to return to its initial position and may deploy another UAV test cell to the interference test position.

Upon receipt of confirmation that a pair of UAV test cells participating in taking a test measurement for the interference test are in their respective positions, the deployment control function 334 may command a first UAV test cell of the pair to transmit a wireless communication signal and a second UAV test cell of the pair to take one or more measurements of the signal robustness value of the wireless communication signal as received by the second UAV test cell.

The data processing function 336 may process one or more signal robustness values for a test measurement of an interference test to determine whether a signal robustness value of a corresponding wireless communication link between a pair of UAV test cells meets a wireless signal threshold value. In instances in which there are multiple signal robustness values received by the data processing function 336 for a test measurement, the data processing function 336 may calculate a representative signal robustness value as the signal robustness value for the test measurement. For example, the representative signal robustness value may be an average of the multiple signal robustness values, a lowest value of the multiple signal robustness values, or a highest value of the multiple signal robustness values. The data processing function 336 in conjunction with the memory 308 may log and store the interference test results, which may include a UAV identifier, the corresponding UAV test cell position, the elevation, a vertical angular orientation for the antenna of the UAV test cell, a horizontal angular orientation for the antenna of the UAV test cell, the frequency of the wireless communication signal, the signal strength of the wireless communication signal, the signal robustness value, a designation of test measurement for the interference test as meeting or not meeting the wireless signal threshold value, and the corresponding pair of UAV test cell positions. Such data may be stored by the data output function 338 in an array format or any other format from which the user may readily correlate the interference test results to the position pairs meeting the wireless signal threshold value. Accordingly, the data processing function 336 may further designate one or more positions of a corresponding pair of UAV positions that lack interference as placement positions for the placement of one or more wireless communication antennas. For example, the data processing function 336 may designate a first position of the corresponding pair as a placement position for a first antenna. Additionally, or alternatively, the data processing function 336 may designate a second position of the corresponding pair as a placement position for a second antenna.

Example Processes

Figure 4:
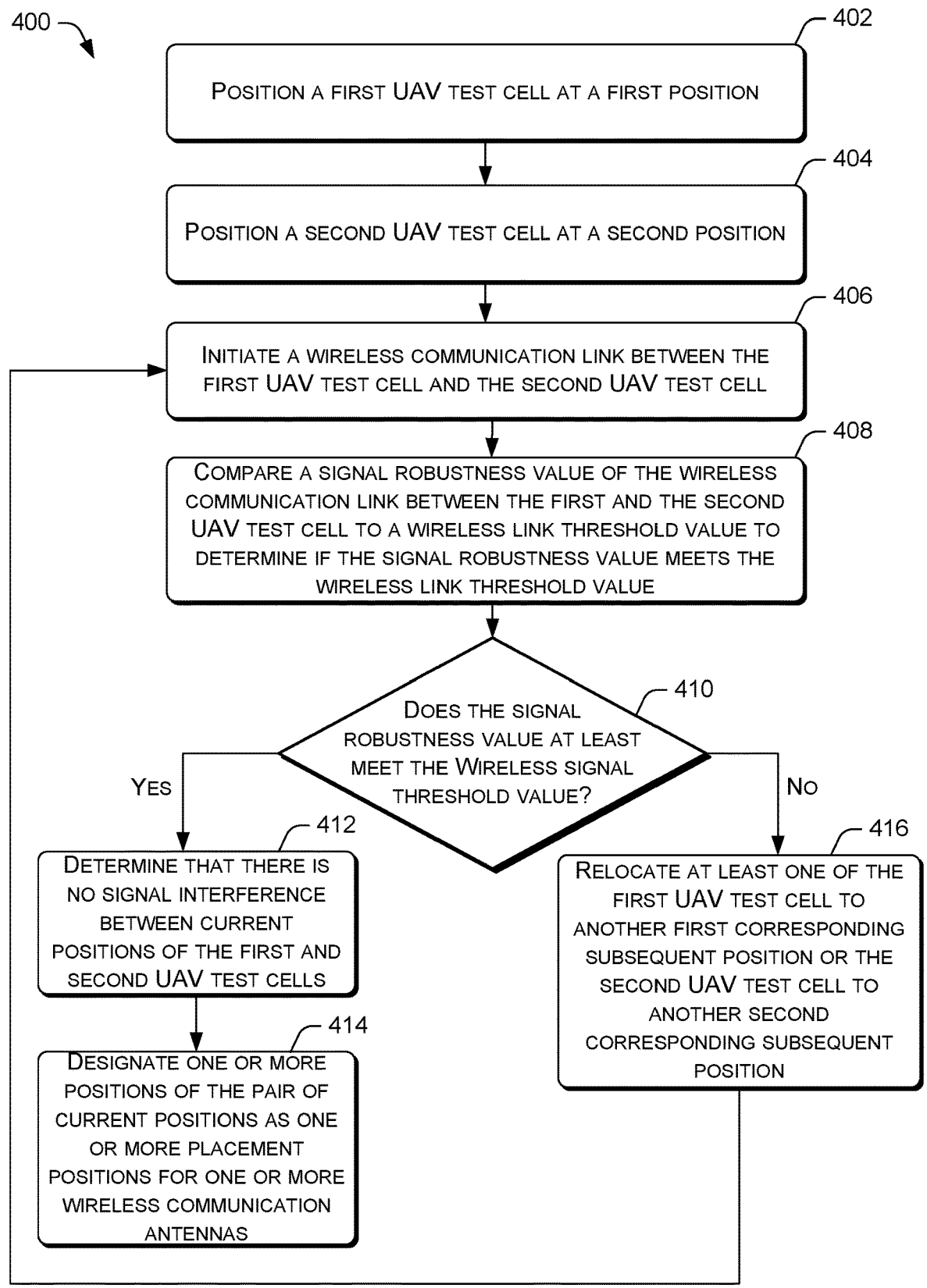
FIG. 4 is a flow diagram of an example process for performing a drone-assisted interference test for the deployment of wireless access infrastructure.
Figure 5:
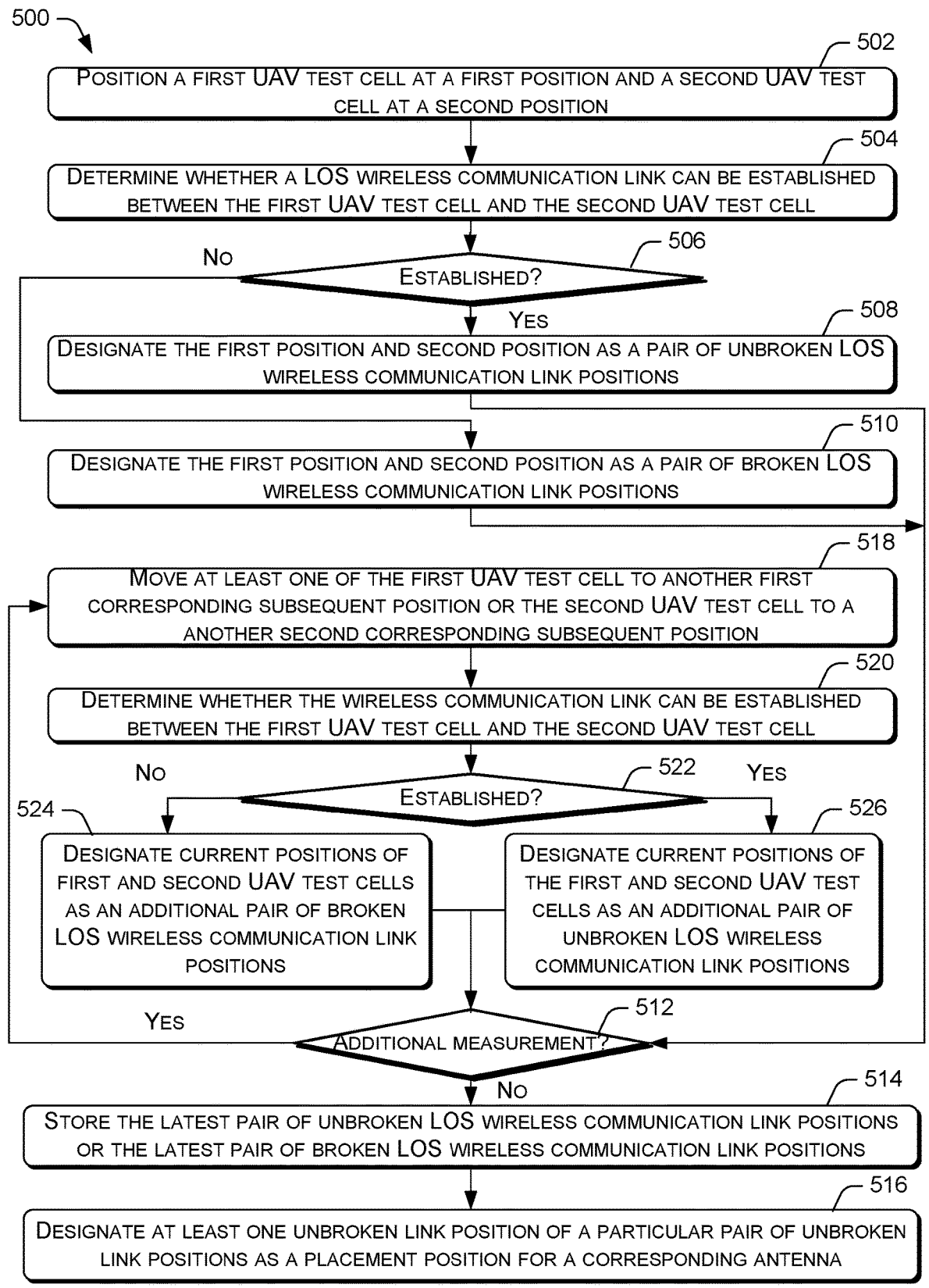
FIG. 5 is a flow diagram of an example process for performing a drone-assisted line-of-sight test for the deployment of wireless access infrastructure.

FIGS. 4 and 5 present illustrative processes 400 and 500 for implementing the interference test and line-of-sight test for the drone-assisted deployment of wireless access infrastructure. Each of the processes 400 and 500 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. The order in which the operations are described is not intended to be construed as a limitation, and any number of the described blocks can be combined in any order and/or in parallel to implement the process. For discussion purposes, the processes 400 and 500 are described with reference to the wireless signal test environment 100 of FIG. 1.

FIG. 4 is a flow diagram of an example process 400 for performing a drone-assisted interference test for the deployment of wireless access infrastructure. At block 402, a UAV test engine controlling the first UAV test cell may position the first UAV test cell at a first position. A position of the first UAV test cell may include a set of geolocation coordinates of the first UAV test cell, an elevation of the first UAV test cell, a vertical angular orientation for an antenna of the first UAV test cell, and/or a horizontal angular orientation for the antenna of the first UAV test cell. At block 404, a UAV test engine controlling the second UAV test cell may position the second UAV test cell at a second position. A position of the second UAV test cell may include a set of geolocation coordinates of the second UAV test cell, an elevation of the second UAV test cell, a vertical angular orientation for the antenna of the second UAV test cell, and/or a horizontal angular orientation for the antenna of the second UAV test cell. In some embodiments, each of the first UAV test cell and the second UAV test cell may be moved to their respective positions by corresponding UAV test engines. In other embodiments, the first UAV test cell and the second UAV test cell may be positioned at their respective positions by a single UAV test engine.

At block 406, a wireless communication link may be initiated between the first UAV test cell and the second UAV text cell. The first UAV test cell may initiate a wireless communication link with the second UAV test cell, or vice versa, for a predetermined time duration. In some embodiments, a signal of the wireless communication link may be initiated at a predetermined frequency and a predetermined signal strength by one of the UAV test cells, so that a signal robustness value of the signal may be measured by the other UAV test cell during the predetermined time duration and sent to a UAV test engine. However, in instances in which a UAV test cell measures multiple signal robustness values during the predetermined time duration, the UAV test cell may send the multiple signal robustness values to the UAV test engine for the UAV test engine to generate a representative signal robustness value to be used as the signal robustness value. In various embodiments, the UAV test engine may be one of the first UAV test engine or the second UAV test engine.

At block 408, the UAV test engine may compare the signal robustness value of the wireless communication link to a wireless signal threshold value. For example, the signal robustness value may be a value that the UAV test engine receives directly from a UAV test cell, or a representative signal robustness value that is generated by the UAV test engine based on multiple signal robustness values for use as the signal robustness value. At decision block 410, the UAV test engine may determine whether the signal robustness value at least meets the wireless signal threshold value. Thus, if the signal robustness value at least meets the wireless signal threshold value, the process 400 may proceed to block 412. At block 412, the UAV test engine may determine that there is no interference between current positions of the first UAV test cell and the second UAV test cell. At block 414, the UAV test engine may designate one or more positions of the pair of current positions as one or more placement positions for one or more wireless communication antennas.

Returning to decision block 410, if the UAV test engine determines that the signal robustness value does not meet the wireless signal threshold value, the process 400 may proceed to block 416. At block 416, at least one of the first UAV test cell may be relocated to another first corresponding subsequent position or the second UAV test cell may be relocated to another second corresponding subsequent position. A corresponding subsequent position of a UAV test cell may be a position that differs in at least one of a geolocation coordinate, an elevation, a vertical angular orientation for the antenna, or a horizontal angular orientation for the antenna from a previous position of the UAV test cell. This means that in some instances, one of the UAV test cells may be maintained at a corresponding current position while the other UAV test cell is moved to a corresponding subsequent position that differs from a corresponding current position of the other UAV test cell. However, in other instances, both UAV test cells may be moved to corresponding subsequent positions that differ from corresponding current positions of the UAV test cells. In various embodiments, such relocation may be performed by a UAV test engine or a pair of UAV test engines working cooperatively.

Subsequently, the process 400 may loop back to block 406 so that an additional test measurement of a wireless communication link may be performed. In some instances, the test measurements may be repeated until a pair of positions with no signal interference is identified. In various embodiments, a pair of positions of the first UAV test cell and the second UAV test cell that are tested by the test measurements of an interference test may include at least one position that belongs to an identified pair of unbroken line-of-sight wireless communication link positions.

FIG. 5 is a flow diagram of an example process 500 for performing a drone-assisted line-of-sight (LOS) test for the deployment of wireless access infrastructure. At block 502, one or more UAV test engines may position a first UAV test cell at a first position and a second UAV test cell at a second position. A position of the first UAV test cell may include a set of geolocation coordinates of the first UAV test cell, an elevation of the first UAV test cell, a vertical angular orientation for an antenna of the first UAV test cell, and/or a horizontal angular orientation for the antenna of the first UAV test cell. Likewise, a position of the second UAV test cell may include a set of geolocation coordinates of the second UAV test cell, an elevation of the second UAV test cell, a vertical angular orientation for the antenna of the second UAV test cell, and/or a horizontal angular orientation for the antenna of the second UAV test cell. In some embodiments, each of the first UAV test cell and the second UAV test cell may be moved to their respective positions by corresponding UAV test engines. In other embodiments, the first UAV test cell and the second UAV test cell may be positioned at their respective positions by a single UAV test engine. The first and the second UAV test cells may be positioned for the performance of a line-of-sight test according to a test configuration profile.

At block 504, a UAV test engine that deployed the first UAV test cell and/or the second UAV test cell may determine whether a line-of-sight wireless communication link can be established between the first UAV test cell and the second UAV test cell. In various embodiments, the first UAV test cell may transmit a wireless communication signal to a second UAV test cell. Accordingly, the UAV test engine may determine that a wireless communication link may be established, i.e., the link is not blocked, when the wireless communication signal is received by the second UAV test cell. On the other hand, the UAV test engine may determine that it is not possible to establish the wireless communication link, i.e., the link is blocked, when the second UAV test cell does not receive the wireless communication signal.

In alternative embodiments, the signal robustness value of the received signal must also at least meet the wireless signal threshold value for the link to be considered not blocked, i.e., can be established. In such embodiments, if the wireless communication signal is not received or if the signal robustness value of the received wireless communication signal does not meet the wireless signal threshold value, the UAV test engine may deem the link to be blocked, i.e., cannot be established. At decision block 506, if the UAV test engine determines that the line-of-sight communication link can be established, the process 500 may proceed to block 508. At block 508, the UAV test engine may designate the first position and the second position as a pair of unbroken line-of-sight wireless communication link positions. However, if the UAV test cell determines at decision block 506 that it is not possible to establish the line-of-sight communication link, the process 500 may proceed to block 510. At block 510, the UAV test engine may designate the first position and the second position as a pair of broken line-of-sight wireless communication link positions. Following the block 508 or the block 510, the process 500 may proceed to decision block 512. At decision block 512, the UAV test engine may determine whether an additional test measurement is to be performed. In various embodiments, the UAV test engine may make such a determination based on the test configuration file for the line-of-sight test. Thus, if the UAV test engine determines that no additional test measurement is to be performed, the process 500 may proceed to block 514. At block 514, the UAV test engine may store the latest pair of unbroken line-of-sight wireless link positions or the latest pair of broken line-of-sight wireless communication link positions. At block 516, the UAV test engine may designate at least one unbroken link position of a particular pair of unbroken link positions as a placement position for a corresponding antenna. In some embodiments, at least one antenna, such as a base station antenna, a wireless backhaul antenna, etc. may be installed at one or more positions designated by the UAV test engine as one or more unbroken line-of-sight wireless communication link positions. For example, the UAV test engine may designate a first position of a pair of unbroken line-of-sight wireless communication link positions as a position for mounting a first antenna, and a second position of the pair as a position for mounting a second antenna such that the first antenna and the second antenna may be used to establish a wireless communication link.

Returning to decision block 512, if the UAV test engine determines an additional test measurement is to be performed, the process 500 may proceed to block 518. At block 518, the one or more UAV test engines may move at least one of the first UAV test cell to another first corresponding subsequent position or the second UAV test cell to another second corresponding subsequent position. A corresponding subsequent position of a UAV test cell may be a position that differs in at least one of a geolocation coordinate, an elevation, a vertical angular orientation for the antenna, or a horizontal angular orientation for the antenna from a previous position of the UAV test cell. This means that in some instances, one of the UAV test cells may be maintained at a corresponding current position while the other UAV test cell is moved to a corresponding subsequent position that differs from a corresponding current position of the other UAV test cell. However, in other instances, both UAV test cells may be moved to corresponding subsequent positions that differ from corresponding current positions of the UAV test cells.

At block 520, a UAV test engine that deployed the first UAV test cell and/or the second UAV test cell may once again determine whether a line-of-sight wireless communication link can be established between the first UAV test cell and the second UAV test cell. At decision block 522, if the UAV test engine determines that the line-of-sight communication link can be established, the process 500 may proceed to block 524. At block 524, the UAV test engine may designate the current positions of the first and second UAV test cells as an additional pair of unbroken line-of-sight wireless communication link positions. However, if the UAV test cell determines at decision block 522 that it is not possible to establish the line-of-sight communication link, the process 500 may proceed to block 526. At block 526, the UAV test engine may designate the current positions of the first and second UAV test cells as an additional pair of broken line-of-sight wireless communication link positions. Subsequently, the process 500 may once again proceed to decision block 512.

CONCLUSION

Although the subject matter has been described in language specific to the structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system, comprising:
one or more processors; and
memory having instructions stored therein, the instructions, when executed by one or more processors, cause the one or more processors to perform acts comprising:
positioning a first unmanned aerial vehicle (UAV) test cell at a first position and a second UAV test cell at a second position;
comparing an average of multiple signal robustness values of a wireless communication link that is established between the first UAV test cell and the second UAV test cell to a wireless signal threshold value; and
in response to the average the multiple signal robustness values at least meeting the wireless signal threshold value, designating one or more of the first position and the second position as one or more proposed placement positions for one or more base station antennas, wherein the one or more proposed placement positions are free of an interference from an existing antenna of the base station;
wherein the average of multiple signal robustness values of the wireless communication link includes an average of signal strength measurements or signal quality measurements; wherein the average of the signal strength measurement includes a received signal strength indicator (RSSI) measurement, reference signal received power (RSRP) measurement, or a received channel power indicator (RCPI) measurement, and wherein the signal quality measurement includes an energy to interface ratio (ECIO) measurement, a reference signal received quality (RSRQ) measurement, a signal to interference-plus-noise ratio (SINR) measurement, a bit error rate (BER) measurement, a low density parity check (LDPC) measurement, a packet error rate (PER) measurement, or a received signal code power (RSCP).

2. The system of claim 1, wherein in response to the average of the multiple signal robustness values failing to meet the wireless signal threshold value, relocating at least one of the first UAV test cell at a third position or the second UAV test cell at a fourth position.

3. The system of claim 2, wherein in response to the average at least meeting the wireless signal threshold value following a relocation of the first UAV test cell to the third position or the second UAV test cell to the fourth position, positioning at least one base station antenna at the third position or the fourth position.

4. The system of claim 1, wherein a position of a UAV test cell includes a longitudinal coordinate, a latitudinal coordinate, an elevation, a vertical angular orientation for an antenna of the UAV test cell, and a horizontal angular orientation for the antenna of the UAV test cell.

5. The system of claim 1, wherein the wireless communication link is established to determine an interference from an existing antenna of a microwave backhaul relay, or a user device.

6. The system of claim 5, wherein the average at least meeting the wireless signal threshold value indicates alack of the interference from, a static sensor, a road side unit (RSU), or the user device.

7. A computer-implemented method, comprising:
positioning, via one or more unmanned aerial vehicle (UAV) test stations, a first UAV test cell at a first position and a second UAV test cell at a second position;
comparing, at a UAV test station, an average of multiple signal robustness values of a wireless communication link that is established between the first UAV test cell and the second UAV test cell to a wireless signal threshold value; and
in response to the average of the multiple signal robustness values of the wireless communication link at least meeting the wireless signal threshold value, designating, via the UAV test station, one or more of the first position and the second position as one or more proposed placement positions for one or more antennas of a base station;
wherein the one or more proposed placement positions are free of an interference from an existing antenna of the base station; wherein the average of multiple signal robustness values of the wireless communication link includes an average of signal strength measurements or signal quality measurements; wherein the average of signal strength measurement includes a received signal strength indicator (RSSI) measurement, reference signal received power (RSRP) measurement, or a received channel power indicator (RCPI) measurement, and wherein the signal quality measurement includes an energy to interface ratio (ECIO) measurement, a reference signal received quality (RSRQ) measurement, a signal to interference-plus-noise ratio (SINR) measurement, a bit error rate (BER) measurement, a low density parity check (LDPC) measurement, a packet error rate (PER) measurement, or a received signal code power (RSCP).

8. The computer-implemented method of claim 7, wherein in response to the average of the multiple signal robustness values of the wireless communication link failing to meet the wireless signal threshold value, relocating at least one of the first UAV test cell at a third position or the second UAV test cell at a fourth position.

9. The computer-implemented method of claim 8, wherein in response to the average at least meeting the wireless signal threshold value following a relocation of the first UAV test cell to the third position or the second UAV test cell to the fourth position, positioning at least one antenna of the base station at the third position or the fourth position.

10. The computer-implemented method of claim 7, wherein a position of a UAV test cell includes a longitudinal coordinate, a latitudinal coordinate, an elevation, a vertical angular orientation for an antenna of the UAV test cell, and a horizontal angular orientation for the antenna of the UAV test cell.

11. The computer-implemented method of claim 7, wherein the average of the multiple signal robustness values of the wireless communication link at least meeting the wireless signal threshold value indicates a lack of interference from, an existing antenna of a microwave backhaul relay, a static sensor, a road side unit (RSU), or a user device.

12. One or more non-transitory computer-readable media storing computer-executable instructions that upon execution cause one or more processors to perform acts comprising:
positioning, via an unmanned aerial vehicle (UAV) test station, a first UAV test cell at a first position and a second UAV test cell at a second position;
comparing, at the UAV test station, a representative signal robustness value of a wireless communication link that is established between the first UAV test cell and the second UAV test cell to a wireless signal threshold value; and
in response to the representative signal robustness value of the wireless communication link at least meeting the wireless signal threshold value, designating, via the UAV test station, one or more of the first position and the second position as one or more proposed placement positions for one or more antennas of a base station,
wherein the one or more proposed placement positions are free of an interference from an existing antenna of the base station or a microwave backhaul relay; wherein the representative signal robustness value includes an average of signal strength measurements or signal quality measurements; wherein the signal strength measurement includes a received signal strength indicator (RSSI) measurement, reference signal received power (RSRP) measurement, or a received channel power indicator (RCPI) measurement, and wherein the signal quality measurement includes an energy to interface ratio (ECIO) measurement, a reference signal received quality (RSRQ) measurement, a signal to interference-plus-noise ratio (SINR) measurement, a bit error rate (BER) measurement, a low density parity check (LDPC) measurement, a packet error rate (PER) measurement, a received signal code power (RSCP) measurement, or a block error rate (BLER) measurement.

13. The one or more non-transitory computer-readable media of claim 12, wherein in response to the representative signal robustness value failing to meet the wireless signal threshold value, relocating at least one of the first UAV test cell at a third position or the second UAV test cell at a fourth position.

14. The one or more non-transitory computer-readable media of claim 13, wherein in response to the representative signal robustness value at least meeting the wireless signal threshold value following a relocation of the first UAV test cell to the third position or the second UAV test cell to the fourth position, positioning at least one antenna of the base station at the third position or the fourth position.

15. The one or more non-transitory computer-readable media of claim 12, wherein a position of a UAV test cell includes a longitudinal coordinate, a latitudinal coordinate, an elevation, a vertical angular orientation for an antenna of the UAV test cell, and a horizontal angular orientation for the antenna of the UAV test cell.

16. The one or more non-transitory computer-readable media of claim 12, wherein the wireless communication link is established to determine the interference from a wireless signal from the microwave backhaul relay.

\* \* \* \* \*